US012695735B2

(12) United States Patent
Das et al.

(10) Patent No.: US 12,695,735 B2
(45) Date of Patent: Jul. 28, 2026

(54) ACCESS TO MESSAGES SENT VIA COLLABORATION APPLICATIONS

(71) Applicant: Citrix Systems, Inc., Fort Lauderdale, FL (US)

(72) Inventors: Pralay Kumar Das, Bengaluru (IN); Shivaraj V Shet, Bengaluru (IN); Shakti Kumar Singh, Bengaluru (IN); Jainil Viren Parikh, Bengaluru (IN); Sreekanth Challa, Bengaluru (IN)

(*) Notice: Subject to any disclaimer, the term of this patent is extended or adjusted under 35 U.S.C. 154(b) by 211 days.

(21) Appl. No.: 17/984,556

(22) Filed: Nov. 10, 2022

(65) Prior Publication Data

US 2024/0098075 A1     Mar. 21, 2024

(30) Foreign Application Priority Data

Sep. 20, 2022     (IN) .............................. 202211053761

(51) Int. Cl.
| | |
|---|---|
| *H04L 9/40* | (2022.01) |
| *H04L 51/224* | (2022.01) |
| *H04L 51/42* | (2022.01) |
| *H04L 51/56* | (2022.01) |

(52) U.S. Cl.
CPC ............ *H04L 63/08* (2013.01); *H04L 51/224* (2022.05); *H04L 51/42* (2022.05); *H04L 51/56* (2022.05)

(58) Field of Classification Search
CPC ....... H04L 63/08; H04L 51/224; H04L 51/42; H04L 51/56
See application file for complete search history.

(56) References Cited

U.S. PATENT DOCUMENTS

2017/0366581 A1* 12/2017 Ylonen ............... H04L 63/0428
2021/0058395 A1*  2/2021 Jakobsson ............. H04L 67/306

OTHER PUBLICATIONS

Mio Internal for Teams, retrieved Nov. 10, 2022, from https://www.m.io/product, and related pages on the same website.
Zapier, Microsoft Teams + Slack Integrations, retrieved Nov. 10, 2022, from https://zapier.com/apps/microsoft-teams/integrations/slack, and related pages on the same website.

* cited by examiner

*Primary Examiner* — Khoi V Le

(57) ABSTRACT

A computing system is disclosed in which messages sent via one or more collaboration applications can be directed to an account of a web portal, rather than to another collaboration application, and an individual can be supplied with one or more access credentials to enable that individual to access such messages, and possibly also respond to received messages and/or initiate messages to one or more users of the one or more collaboration application, via the web portal.

20 Claims, 12 Drawing Sheets

150

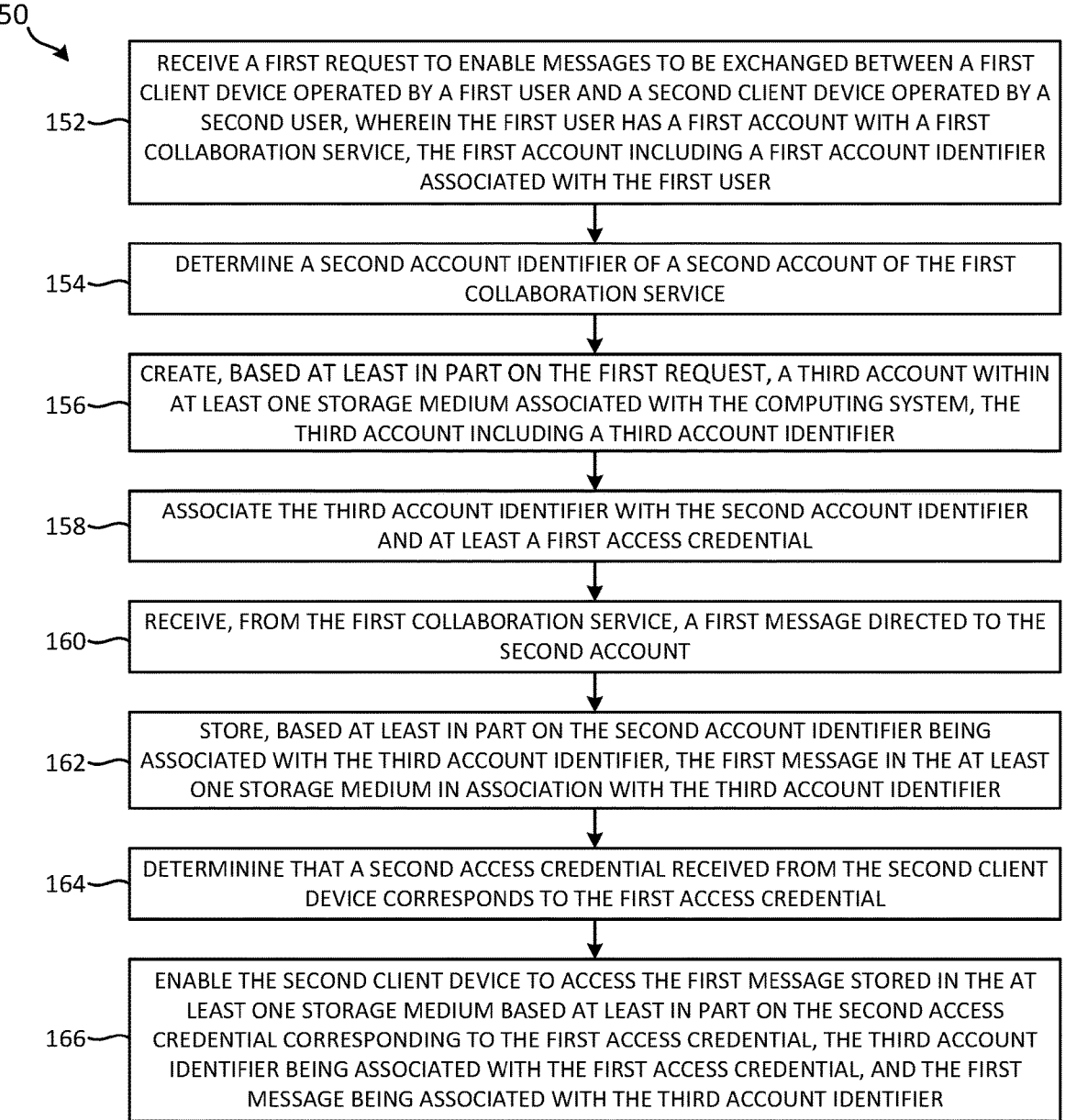

152 — RECEIVE A FIRST REQUEST TO ENABLE MESSAGES TO BE EXCHANGED BETWEEN A FIRST CLIENT DEVICE OPERATED BY A FIRST USER AND A SECOND CLIENT DEVICE OPERATED BY A SECOND USER, WHEREIN THE FIRST USER HAS A FIRST ACCOUNT WITH A FIRST COLLABORATION SERVICE, THE FIRST ACCOUNT INCLUDING A FIRST ACCOUNT IDENTIFIER ASSOCIATED WITH THE FIRST USER

154 — DETERMINE A SECOND ACCOUNT IDENTIFIER OF A SECOND ACCOUNT OF THE FIRST COLLABORATION SERVICE

156 — CREATE, BASED AT LEAST IN PART ON THE FIRST REQUEST, A THIRD ACCOUNT WITHIN AT LEAST ONE STORAGE MEDIUM ASSOCIATED WITH THE COMPUTING SYSTEM, THE THIRD ACCOUNT INCLUDING A THIRD ACCOUNT IDENTIFIER

158 — ASSOCIATE THE THIRD ACCOUNT IDENTIFIER WITH THE SECOND ACCOUNT IDENTIFIER AND AT LEAST A FIRST ACCESS CREDENTIAL

160 — RECEIVE, FROM THE FIRST COLLABORATION SERVICE, A FIRST MESSAGE DIRECTED TO THE SECOND ACCOUNT

162 — STORE, BASED AT LEAST IN PART ON THE SECOND ACCOUNT IDENTIFIER BEING ASSOCIATED WITH THE THIRD ACCOUNT IDENTIFIER, THE FIRST MESSAGE IN THE AT LEAST ONE STORAGE MEDIUM IN ASSOCIATION WITH THE THIRD ACCOUNT IDENTIFIER

164 — DETERMININE THAT A SECOND ACCESS CREDENTIAL RECEIVED FROM THE SECOND CLIENT DEVICE CORRESPONDS TO THE FIRST ACCESS CREDENTIAL

166 — ENABLE THE SECOND CLIENT DEVICE TO ACCESS THE FIRST MESSAGE STORED IN THE AT LEAST ONE STORAGE MEDIUM BASED AT LEAST IN PART ON THE SECOND ACCESS CREDENTIAL CORRESPONDING TO THE FIRST ACCESS CREDENTIAL, THE THIRD ACCOUNT IDENTIFIER BEING ASSOCIATED WITH THE FIRST ACCESS CREDENTIAL, AND THE FIRST MESSAGE BEING ASSOCIATED WITH THE THIRD ACCOUNT IDENTIFIER

FIG. 1D

ACCESS TO MESSAGES SENT VIA COLLABORATION APPLICATIONS

CROSS-REFERENCE TO RELATED APPLICATIONS

This application claims priority under 35 U.S.C. § 119(a) to Provisional Application No. 202211053761, entitled IMPROVING ACCESS TO MESSAGES SENT VIA COLLABORATION APPLICATIONS, which was filed with the Indian Patent Office on Sep. 20, 2022, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, FL, including the Citrix Workspace™ family of products, provide such capabilities. Various collaboration applications have also been developed that allow users to exchange messages with one another via a server-based platform. Examples of such collaboration applications include Teams, Slack, Webex, Zoom, Outlook, etc.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method includes receiving, by a computing system, a first request to enable messages to be exchanged between a first client device operated by a first user and a second client device operated by a second user, wherein the first user has a first account with a first collaboration service, the first account including a first account identifier associated with the first user; determining, by the computing system, a second account identifier of a second account of the first collaboration service; creating, by the computing system and based at least in part on the first request, a third account within at least one storage medium associated with the computing system, the third account including a third account identifier; associating, by the computing system, the third account identifier with the second account identifier and at least a first access credential; receiving, by the computing system and from the first collaboration service, a first message directed to the second account; storing, by the computing system and based at least in part on the second account identifier being associated with the third account identifier, the first message in the at least one storage medium in association with the third account identifier; determining, by the computing system, that a second access credential received from the second client device corresponds to the first access credential; and enabling, by the computing system, the second client device to access the first message stored in the at least one storage medium based at least in part on the second access credential corresponding to the first access credential, the third account identifier being associated with the first access credential, and the first message being associated with the third account.

In some embodiments, a computing system includes at least one processor, and at least one computer-readable medium encoded with instructions which, when executed by the at least one processor, cause the computing system to receive a first request to enable messages to be exchanged between a first client device operated by a first user and a second client device operated by a second user, wherein the first user has a first account with a first collaboration service, the first account including a first account identifier associated with the first user, to determine a second account identifier of a second account of the first collaboration service, to create, based at least in part on the first request, a third account within at least one storage medium associated with the computing system, the third account including a third account identifier, to associate the third account identifier with the second account identifier and at least a first access credential, to receive, from the first collaboration service, a first message directed to the second account, to store, based at least in part on the second account identifier being associated with the third account identifier, the first message in the at least one storage medium in association with the third account identifier, to determine that a second access credential received from the second client device corresponds to the first access credential, and to enable the second client device to access the first message stored in the at least one storage medium based at least in part on the second access credential corresponding to the first access credential, the third account identifier being associated with the first access credential, and the first message being associated with the third account identifier.

In some embodiments, at least one non-transitory computer-readable medium is encoded with instructions which, when executed by at least one processor of a computing system, cause the computing system to receive a first request to enable messages to be exchanged between a first client device operated by a first user and a second client device operated by a second user, wherein the first user has a first account with a first collaboration service, the first account including a first account identifier associated with the first user, to determine a second account identifier of a second account of the first collaboration service, to create, based at least in part on the first request, a third account within at least one storage medium associated with the computing system, the third account including a third account identifier, to associate the third account identifier with the second account identifier and at least a first access credential, to receive, from the first collaboration service, a first message directed to the second account, to store, based at least in part on the second account identifier being associated with the third account identifier, the first message in the at least one storage medium in association with the third account identifier, to determine that a second access credential received from the second client device corresponds to the first access credential, and to enable the second client device to access the first message stored in the at least one storage medium based at least in part on the second access credential corresponding to the first access credential, the third account identifier being associated with the first access credential, and the first message being associated with the third account identifier.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1D illustrates an example routine that may be performed by the portal account system shown in FIGS. 1A-C;

DETAILED DESCRIPTION

Figure 1A:
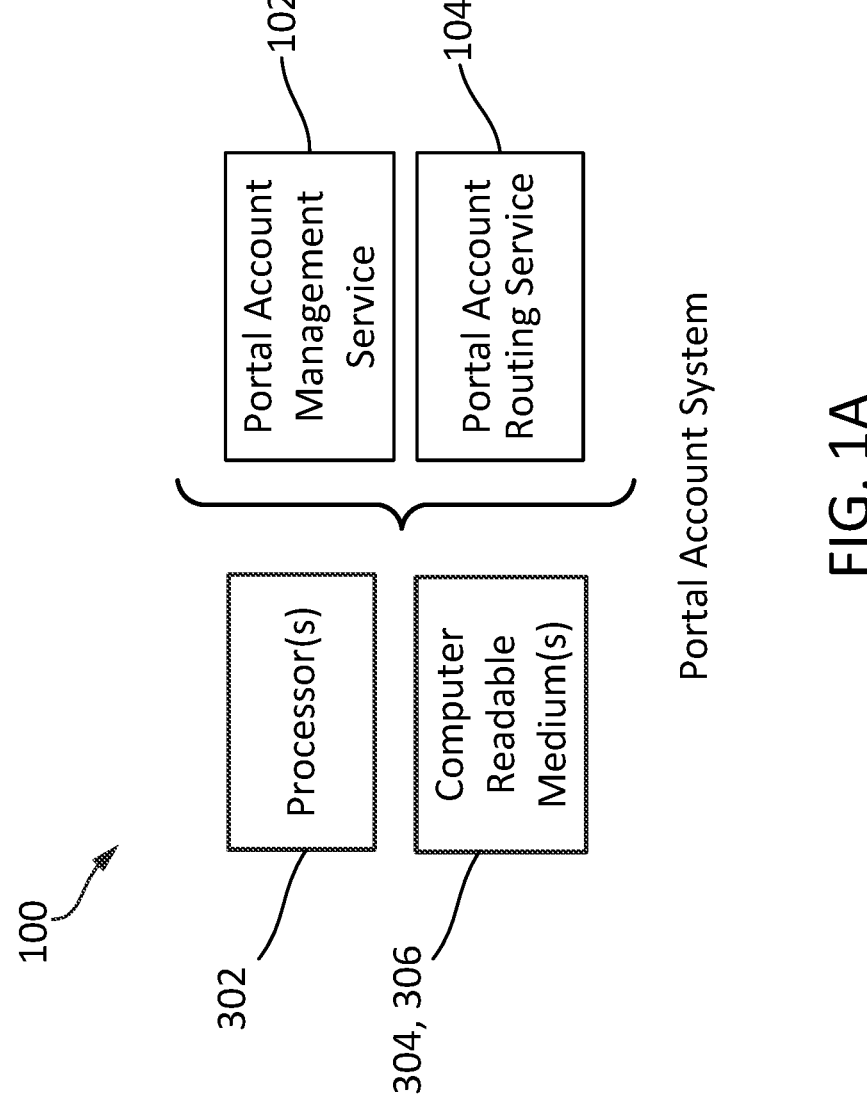
FIG. 1A is a block diagram of a portal account system configured in accordance with some embodiments of the present disclosure.

Communication plays a vital role in sharing information, and enterprise collaboration applications, such as Teams, Slack, Webex, Zoom, Outlook, etc., provide platforms that enable quick interactions between the end-users.

Typically, for one user to send a message to another user via a collaboration application, it is necessary for both users to have the same collaboration application installed and running on their respective client devices. Further, the recipient user needs to be familiar with the operation of the collaboration application and regularly check it for received messages, lest the messages sent to the recipient user via the collaboration application may not be viewed by the recipient in a timely manner. It is also common for a given user to have a preferred collaboration application and to monitor only that preferred application for messages on a regular basis, thus resulting in the user potentially missing messages that were sent via different collaboration applications. To address these issues, certain systems have been designed to enable cross-platform messaging, that is, to enable one user on one platform, e.g., Teams, to send a message to another user on another platform, e.g., Slack. The "Mio" product, described at the universal resource locator (URL) "m.io" is one example of such a cross-platform messaging system.

Although such cross-platform messaging solutions meet certain needs, the inventors have recognized and appreciated that circumstances can arise in which an individual may not have access to, or simply prefer not to use, a messaging application that is supported by such a system. For example, a contractor working for an organization on a temporary basis might not have an account with Teams, Slack, etc.

Offered is a system in which messages sent via one or more collaboration applications, e.g., Teams, Slack, etc., can be directed to an account of a web portal, rather than to another collaboration application, and an individual can be supplied with one or more access credentials, e.g., a user name and password, quick response (QR) code, etc., to enable that individual to access such messages, and possibly also respond to received messages and/or initiate messages to one or more users of the collaboration application(s), via the web portal.

For purposes of reading the description of the various embodiments below, the following descriptions of the sections of the specification and their respective contents may be helpful:

Section A provides an introduction to example embodiments of a portal account system;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the portal account system introduced above in Section A;

Section G describes example implementations of methods, systems/devices, and computer-readable media in accordance with the present disclosure.

A. Introduction to Illustrative Embodiments of a
Portal Account System

An example of a portal account system 100 that may provide the novel capabilities noted above is shown in FIG. 1A. As shown, in some implementations, the portal account system 100 may include two functional modules, including a portal account management service 102 and a portal account routing service 104, that may be implemented using one or more processors 302 and one or more computer readable mediums 304, 306 that are encoded with instructions which, when executed by the processors(s) 302, perform the various operations described herein. An example computing system 300 including such processor(s) 302 and computer-readable mediums 304, 306 is described below in Section C. In some implementations, the portal account system 100 may be embodied by one or more sems 204 of the type described below in Sections B through D. For example, in some implementations, the portal account system 100 may be included amongst the resource management services 502 described in Section E.

Figure 1B:
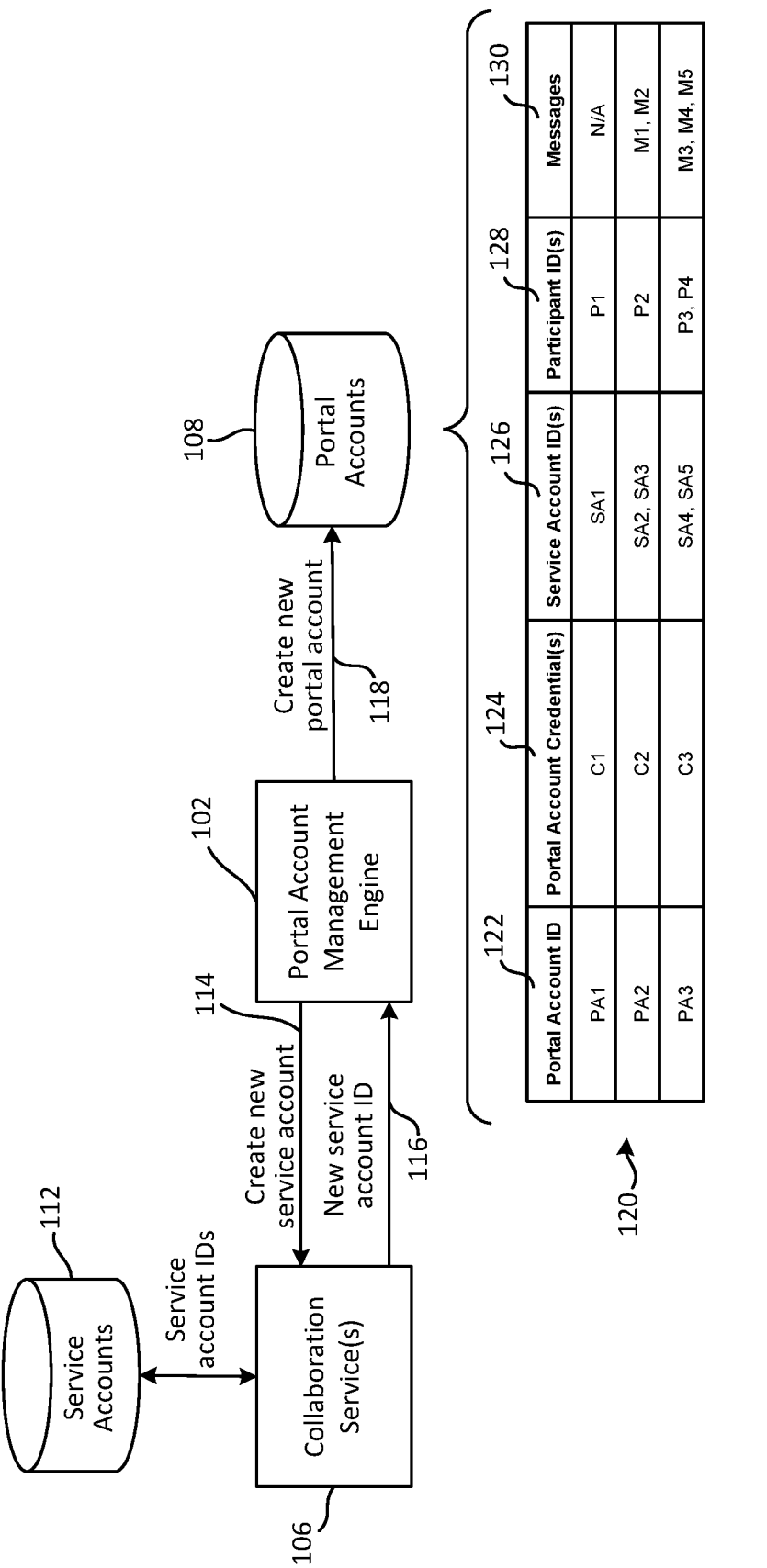
FIG. 1B illustrates example operations that may be performed by the portal account management service shown in FIG. 1A.

FIG. 1B illustrates example operations that may be performed by the portal account management service 102 of the portal account system 100 shown in FIG. 1A to create new portal accounts, e.g., within one or more databases or other storage mediums 108. As shown in FIG. 1B, individual portal accounts may be represented in the storage medium(s) 108 via respective rows of a table 120. As explained in more detail below, the portal account management service 102 may be responsible for populating and/or modifying the entries 122, 124, 126, and 128 in the table 120 to create new portal accounts and/or modify existing portal accounts.

Figure 1C:
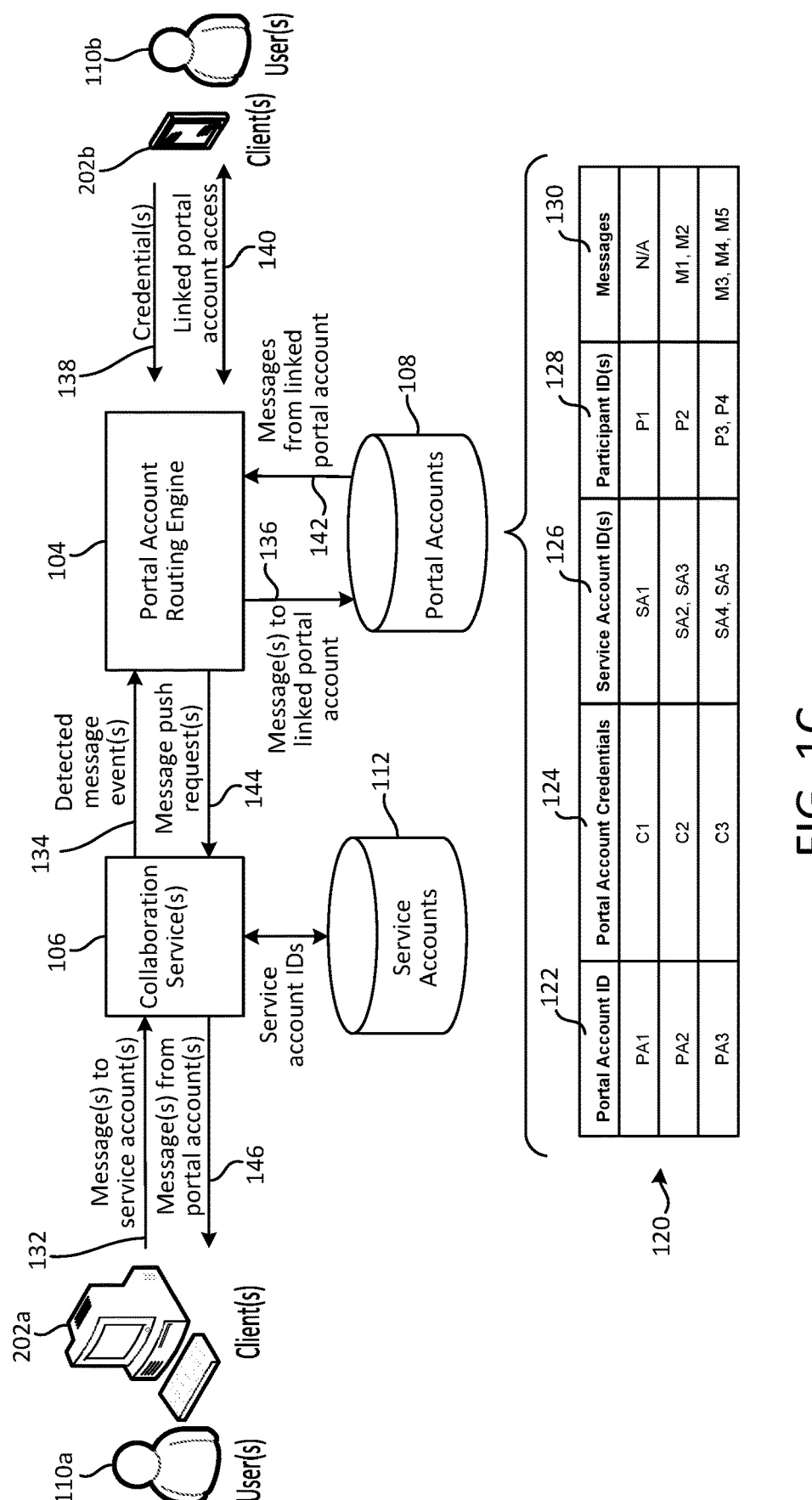
FIG. 1C illustrates example operations that may be performed by the portal account routing service shown in FIG. 1A.

FIG. 1C illustrates example operations that may be performed by the portal account routing service 104 of the portal account system 100 shown in FIG. 1A to route messages between the collaborations service(s) 106 and the various portal accounts created within the storage mediums 108, as well as to allow one or more client devices 202b to interact with particular ones of such portal accounts, thus enabling the exchange of messages between one or more users 110a of the client device(s) 202a and one or more user(s) 110b of the client device(s) 202b. As explained in more detail below, the portal account routing service 104 may be responsible for populating the "messages" entries 130 in the table 120 with one or more messages directed to the service accounts IDs indicated by the corresponding "service account ID(s)" entries 126 in the table 120, as well as for communicating new messages added to the "messages" entries 130 to one or more participants indicated by the corresponding "participant ID(s)" entries 128.

FIG. 1D, which is also described in more detail below, shows an example routine 150 that may be performed by the portal account system 100 shown in FIGS. 1A-C in accordance with some embodiments of the present disclosure.

The collaboration service(s) 106 shown in FIGS. 1B and 1C may include one or more server-based collaboration applications that enable the exchange of messages between users, such as Microsoft Teams, Slack, Zoom Chat, etc. Typically, a client device 202 (not shown in FIG. 1B) may send a message to another client device via a collaboration service 106 provided both clients have accounts with the service. Such accounts are sometimes referred to herein as "service accounts." As shown in FIGS. 1B and 1C, identifiers of such service accounts may be stored in a database or other storage medium 112 and may be accessed by a corresponding collaboration service 106. For example, if a Teams user with a service account types a name into the search bar of the Teams user interface, the Teams application will identify any service accounts in the Teams database that match the entered name, and the user may then elect to send a chat message to a selected one of the identified service accounts.

As indicated by an arrow 114 in FIG. 1B, in some implementations, the portal account management service 102 may send an instruction to a collaboration service 106, e.g., via an application programming interface (API) of the collaboration service 106, to create a new service account that is to be associated with a portal account. For example, if the collaboration service 106 is a Microsoft Teams server, the portal account management service 102 may send an API command to the server to add a new guest account within the collaboration service 106. As described in more detail below, such a request may be initiated, for example, in response to receipt of a request to create a new portal account for a particular user, e.g., the user 110b shown in FIG. 1C, to enable that user to communicate with one or more users of the collaboration service 106, e.g., the user 110a shown in FIG. 1C), without requiring use of a specialized local application for use with that service (e.g., a locally-installed Teams application). As indicated by an arrow 116 in FIG. 1B, in some implementations, the collaboration service 106 may return a service account ID for the newly created service account (e.g., a guest account) to the portal account management service 102. In some implementations, the new service account ID may be an email address or other descriptive identifier of the user for whom a new portal account is being created, e.g., the user 110b shown in FIG. 1C.

In other implementations, one or more collaboration services 106 may not require a service account to be established in order for a registered user of that collaboration service to direct a message to a particular service account identifier. In such implementations, it thus may not be necessary to create a temporary service account (e.g., a guest account) to enable messages to be directed to a particular service account identifier. For collaboration services 106 of this type, the portal account management engine 102 can simply select a service account ID that is unique within the system, such an email address of the user for whom a new portal account is being created, e.g., the user 110b shown in FIG. 1C. As described below, although the collaboration service 106 may itself be unable to route a message directed to the selected service account ID, the portal account routing service 104 may detect (e.g., via an API of the collaboration service 106) a "send message" event directed to the selected service account ID and route the corresponding message to an appropriate portal account, e.g., as a "messages" entry 130.

As indicated by an arrow 118 in FIG. 1B, following creation and/or selection of one or more new service account IDs within the collaboration service(s) 106, the portal account management service 102 may create a new portal account within the storage medium(s) 108. As noted above, in some implementations, the creation of a new portal account within the storage medium(s) 108 may involve writing a new row to the table 120 that associates an identifier of the portal account, e.g., as a "portal account ID" entry 124, with the newly-determined service account ID(s), e.g., as one or more "service account ID(s)" entries 126. As indicated in the second row of the table 120, in some implementations, multiple service account IDs may be associated with the same portal account ID. Such a configuration may be useful, for example, to enable messages to be exchanged between the new portal account and multiple different collaboration services (e.g., both Teams and Slack). As explained in more detail below, if a detected message event (see arrow 134 in FIG. 1C) is directed to any of the service account IDs associated with a given portal ID in a row, the message may be stored within the portal account identified by that portal ID, e.g., as a new "message" entry 130 in the same row. When a new portal account is first created, it would not have any messages in it, except perhaps a system-generated message welcoming the user for whom the portal account was created, e.g., a user 110b, to the service. The first row of the table 120 shown in FIG. 1B may correspond, for example, to a newly created account, as it does not yet have any "messages" entries 130 associated with it.

As illustrated in FIG. 1B, the creation of a new portal account within the storage medium(s) 108 may further involve associating "participant ID(s)" entries 128 for the user(s) 110a, 110b of the collaboration service(s) 106 that are to receive new messages that are written to the portal account, e.g., by writing such "participant ID(s)" entries 128 in the same row as the "portal account ID" entry 122 for the newly-created portal account. As explained in more detail below, in some implementations, in response to a new message being added to a portal account, e.g., as a new "messages" entry 130, the portal account routing service 104 may automatically route that message to each of the individuals identified by the "participant ID(s)" entries 128 for the portal account, perhaps excluding the individual who authored the message, e.g., to prevent the message from appearing multiple times in a thread for an ongoing chat. In some implementations, for example, the portal account routing service 104 may use API(s) of the collaboration service(s) 106 to push new messages to one or more service accounts of the identified participant(s) and/or may write new messages to portal accounts associated with other users 110*b*. Although not illustrated, it should be appreciated that the portal account routing service 104 may additionally keep records identifying service account ID(s) and/or portal accounts for the various users 110*a*, 110*b* thus enabling the portal account routing service 104 to route new messages that are added to a portal account to the appropriate service accounts and/or other portal accounts for the individuals identified by the "participant ID(s)" entries 128. In some implementations, such newly added messages may be routed to all of an identified user's active service accounts and/or portal accounts. In other implementations, such messages may be routed only to one or more particular service accounts and/or portal accounts for such user(s).

In view of the above, it should be appreciated that the configuration described herein can, in some implementations, enable a "group chat" amongst three or more users 110*a*, 110*b* of the system, even if no user 110*b* is provided with access credentials to access the portal account via a client device 202*b*, e.g., via a browser of a client device 202*b*, in the manner described below. For example, in some implementations, rather than selecting a portal account ID that identifies an individual (e.g., the user 110*b* shown in FIG. 1C) who is to allowed to access the portal account via a web portal, a portal account ID can be selected that identifies a "group" of registered users 110*a* of one or more of the collaboration services 106. The portal account system 100 may thus advantageously enable a group chat amongst respective users 110*a* of multiple different collaborations services 106, whether or not a user 110*b* is also given permission to access the corresponding portal account.

As shown in FIG. 1B, in some implementations, the creation of a new portal account within the storage medium(s) 108 may further involve associating "portal access credential(s)" entries 124 with the portal account, e.g., by writing such "portal account credential(s)" entries 124 in the same row as the "portal account ID" entry 122 for the newly-created portal account. As described below in connection with FIG. 1C, a client device 202*b* may provide one or more access credentials to the portal account routing service 104 to gain access to a portal account corresponding to those credentials. The "portal access credentials" entries 124 may take on any of numerous forms. In some implementations, they may include data embedded within a QR code that is provided to a user 110*b* of the client device 202*b*. In such implementations, when the user scans that QR code using a camera of the client device 202*b*, a browser on the client device 202*b* may navigate to an internet protocol (IP) address corresponding to a uniform resource locator (URL) identified by the QR code and present the QR code data. If the portal account routing service 104 finds corresponding QR data in the table 120, then it may enable the client device

202*b* to access the corresponding portal account. In other implementations, the "portal access credential(s)" entries 124 may include a user name and password for the user 110*b* of the client device 202*b*, biometric data of the user 110*b* of the client device 202*b*, etc.

The configuration data for a portal account (e.g., entries 122, 124, 126 and 128 in the table 120) may be set in any of a number of ways. In some implementations, some or all of such data may be set by a system administrator (not shown in FIG. 1B), or may require approval by a system administrator prior to being entered and/or going live. In some implementations, for example, a registered user 110*a* of a collaboration service 106 may submit a request for creation of a portal account for use by an individual who is not a registered user of the collaboration service 106, and such request may be routed to a system administrator for approval. Upon the system administrator approving the creation of the portal account, the portal account management service 102 may assign a new portal account ID to the new portal account and create a new row in the table 120. The portal account management service 102 may additionally determine one or more service account IDs for the new portal account as well as one or more credentials for use in accessing the account. The portal account management service 102 and/or the system administrator may then provide access credential(s) to a user 110*b* of a client device 202*b* whom is to be provided access to the portal account.

In some implementations, the user 110*a* requesting creation of the new portal account and/or the system administrator may additionally set and/or change one or more participant IDs that are included in the portal account (e.g., as "participant ID(s)" entries 128) in the table 120. Additionally or alternatively, the user 110*a* requesting creation of the new portal account and/or the system administrator may enable the user 110*b* for whom the portal account is being created to set and/or change the "participant ID(s)," perhaps by providing the user 110*b* with a list of registered users 110*a* with whom the user 110*b* is permitted to communicate via the web portal, possibly including a subset of all the registered users 110*a*, and allowing the user 110*b* to select one of more such individuals from such a list for inclusion on a message chat.

The manner in which the portal account routing service 104 may control the routing of messages amongst client devices 202*a*, 202*b* operated by various users 110*a*, 110*b* will now be described with reference to FIG. 1C. In particular, for illustrative purposes, the following discussion will focus on operations that may be performed by the portal account routing service 104 after the portal account management service 102 has been used to populate the first row of the table 120 as indicated. As shown, the first row of the table 120 represents a portal account that has been assigned a "portal account ID" entry 122 with a value of "PA1." The value "PA1" may represent, for example, an email address of a user 110*b* to whom that particular portal account has been assigned. With respect to the "service account ID(s)" entry 126 in the first row, the value "SA1" may represent, for example, a service account ID that has been associated with the portal account ID "PA1" for a collaboration service 106 (e.g., Teams). As for the "participant ID(s)" entry 128 in the first row, the value "P1" may represents a registered user 110*a* of the collaboration service 106 (e.g., Teams). As can be appreciated from the following discussion, configuring the portal account "PA1" in such a manner may enable the users 110*a* and 110*b* to operate the client devices 202*a* and 202*b*, respectively, to exchange messages with one another, with the first client device 202*a* interacting with the collaboration service (e.g., Teams) and the second client device 202b interacting with a web portal enabled by the portal account routing service 104.

As indicated by an arrow 132 in FIG. 1C, the user 110a may operate the client device 202a to compose a message using a collaboration application (e.g., a local Teams application) and instruct the collaboration service 106 (e.g., a Teams server) to send that message to a particular service account ID. If the user 110a wishes to send the message to a portal account for access by the second user 110b, the user 110a may direct the message to the service account ID "SA1." As indicated previously, in some implementations, the service account ID "SA1" that is associated with the portal account ID "PA1" in the table 120 may be a descriptive identifier, such as an email address of the user 110b or a name of a chat group of which the user 110b is a member, thus making it easier for the user 110a to identify the service account ID to which the message is to be directed.

In some implementations, the portal account routing service 104 may set a hook, e.g., via one or more APIs of the collaboration service 106, to listen for messages directed to the service account ID "SA1." As indicated by the arrow 134 in FIG. 1C, when the collaboration service 106 detects such a message, it may send a notification to the portal account routing service 104 concerning the message event. Upon receipt of such a notification, the portal account routing service 104 may consult the table 120 and determine, based on the contents of the first row, that the service account ID "SA1" is associated with the portal account ID "PA1." In response to determining the existence of such an association, as indicated by an arrow 136 in FIG. 1C, the portal account routing service 104 may write the detected message to the linked portal account, e.g., as a "messages" entry 130 in the first row.

As indicated by an arrow 138 in FIG. 1C, the user 110b may operate the client device 202b to provide one or more access credentials to the portal account routing service 104. For example, as noted above, in some implementations, the user 110b may use a camera of the client device 202b to scan a QR code associated with the portal account ID "PA1," thus causing a browser of the client device 202b to access a web page identified by the QR code and supply an access code of the QR code to the portal account routing service 104. In other implementations, the user 110b may instead use a browser to navigate to a web page provided by the portal account routing service 104, and supply some other form of access credentials to the portal account routing service 104 in some other manner, e.g., by entering a user name and password.

In any event, as indicated by an arrow 140 in FIG. 1C, if the portal account routing service 104 determines that the received access credential(s) match the access credentials associated with the portal account ID "PA1," the portal account routing service 104 may provide the client device 202b with access to that portal account. In some implementations, for example, upon being granted such access, the client device 202b may display one or more of the messages that have been written as "messages" entries 130 in the first row of the table 120. As noted above, such message(s) may include the message that the user 110a previously directed to the service account ID "SA1."

In some implementations, the user 110b may further be able to use the client device 202b to interact with the accessed portal account to compose and send a new message to the participant(s) identified by the "participant ID(s)" entries 128 in the first row of the table 120. In addition as appearing as new "sent" messages in the user's web portal interface, as indicated by arrows 142 and 144 in FIG. 1C, any messages that are newly written to the portal account may be detected by the portal account routing service 104 and sent to the identified participant(s) via one or more collaboration services 106. For instance, for the above noted example, the user 110a may have the participant ID "P1" and, as such, the portal account routing service 104 may determine to send the message composed the user 110b using the web portal interface to one or more service accounts associated with the user 110a, e.g., the Teams account of the user 110a. For example, as indicated by the arrow 144, in some implementations, the portal account routing service 104 may use one or more APIs of the collaboration service(s) 106 to push the newly composed message to such service account(s).

Finally, as indicated by an arrow 146 in FIG. 1C, in some implementations, the collaboration service(s) 106 may direct the message(s) that were written to the portal account and pushed to the service account(s) of the user 110a, such as by sending such message(s) to local application(s) for the corresponding collaboration service(s) '06. For instance, if the user 110a used a local Teams application to send the initial message to the service account SA1, the portal account routing service 104 may send the message the second user added to the portal account to that same local Teams application for presentation to the user 110a.

Further, although not specifically shown in the example table 120 shown in FIGS. 1B and 1C, it should be appreciated that, in some implementations, the participant IDs associated with a given portal account can include one or more participant IDs that identify one or more custodians of one or more other portal accounts, and the portal account routing service 104 may additionally or alternatively be configured to cause one or more messages written to the corresponding portal account to be copied to the other portal account(s) assigned to such custodian(s).

As noted above, FIG. 1D shows an example routine 150 that may be executed by the portal account system 100 shown in FIGS. 1A-C in accordance with some embodiments of the present disclosure. As shown, the routine 150 may begin at a step 152, at which the portal account system 100 may receive a request to enable messages to be exchanged between a first client device (e.g., the client device 202a) operated by a first user (e.g., the user 110a) and a second client device (e.g., the second client device 202b) operated by a second user (e.g., the user 110b), wherein the first user (e.g., the user 110a) has a first account (e.g., a Teams account) with a first collaboration service 106 (e.g., Teams), the first account including a first account identifier (e.g., an email address or other Teams account identifier) associated with the first user (e.g., the user 110a). As noted above, such a request may correspond, for example, to a request the first user (e.g., the user 110a) submits to the portal account management service 102 to create a portal account for the second user (e.g., the user 110b).

At a step 154 of the routine 150, the portal account system 100 may determine a second account identifier (e.g., a service account ID) of a second account (e.g., a Teams account) of the first collaboration service 106 (e.g., Teams). As noted above, in some implementations, such a determination may involve the portal account management service 102 instructing the first collaboration service 106 (e.g., Teams) to create a new account (e.g., by using an API of the collaboration service 106 to create a guest account) for use by the portal account system 100.

At a step 156 of the routine 150, the portal account system 100 may create, based on the first request, a third account (e.g., a portal account) within at least one storage medium 108, the third account including a third account identifier (e.g., a portal account ID). As noted above, in some implementations, the creation of such a portal account may involve writing a new row to the table 120 shown in FIGS. 1B and 1C, with such row including a "portal account ID" entry 122 uniquely identifying the new portal account within the portal account system 100.

At a step 158 of the routine 150, the portal account system 100 may associate the third account identifier (e.g., the portal account ID) with the second account identifier (e.g., the service account ID for the Teams guest account) and at least a first access credential (e.g., QR code data). As noted above, the first access credential may additionally be provided to the second user (e.g., by sending a QR code that includes the QR code data to the user 110*b*) to enable the second user (e.g., the user 110*b*) to subsequently access the newly created portal account.

At a step 160 of the routine 150, the portal account system 100 may receive, from the first collaboration service 106 (e.g., Teams), a first message (e.g., a Teams chat message) directed to the second account (e.g., the Teams guest account associated with the portal account). As noted above, for example, in some implementations, the portal account routing service 104 may use one or more APIs of the collaboration service 106 (e.g., Teams) to listen for new messages that are directed to the Teams guest account associated with the portal account.

At a step 162 of the routine 150, the portal account system 100 may store, based at least in part on the second account identifier (e.g., the Teams guest account ID) being associated with the third account identifier (e.g., the portal account ID for the portal account), the first message in the at least one storage medium 108, e.g., as a new "messages" entry 130 in the table 120, in association with the third account identifier (e.g., the portal account ID).

At a step 164 of the routine 150, the portal account system 100 may determine that a second access credential (e.g., QR code data) received from the second client device (e.g., the client device 202*b*) corresponds to the first access credential (e.g., previously stored QR data corresponding to the QR code that was previously sent to the user 110*b*).

At a step 166 of the routine 150, the portal account system 100 may enable the second client device (e.g., the client device 202*b*) to access the first message stored in the at least one storage medium 108 based at least in part on the second access credential (e.g., the received QR data) corresponding to the first access credential (e.g., the stored QR data), the third account identifier (e.g., the portal account ID) being associated with the first access credential (e.g., the stored QR data), and the first message being associated with the third account identifier (e.g., the portal account ID). As noted above, for example, in some implementations, upon determining that the received access credential(s) match the stored access credential(s) for a portal account, the user 110*b* may be permitted to use a browser of the client device 202*b* to access messages stored in that portal account, e.g., as "messages" entries 130 in the table 120, via a web portal.

Additional details and example implementations of embodiments of the present disclosure are set forth below in Section F, following a description of example systems and network environments in which such embodiments may be deployed.

B. Network Environment

Figure 2:
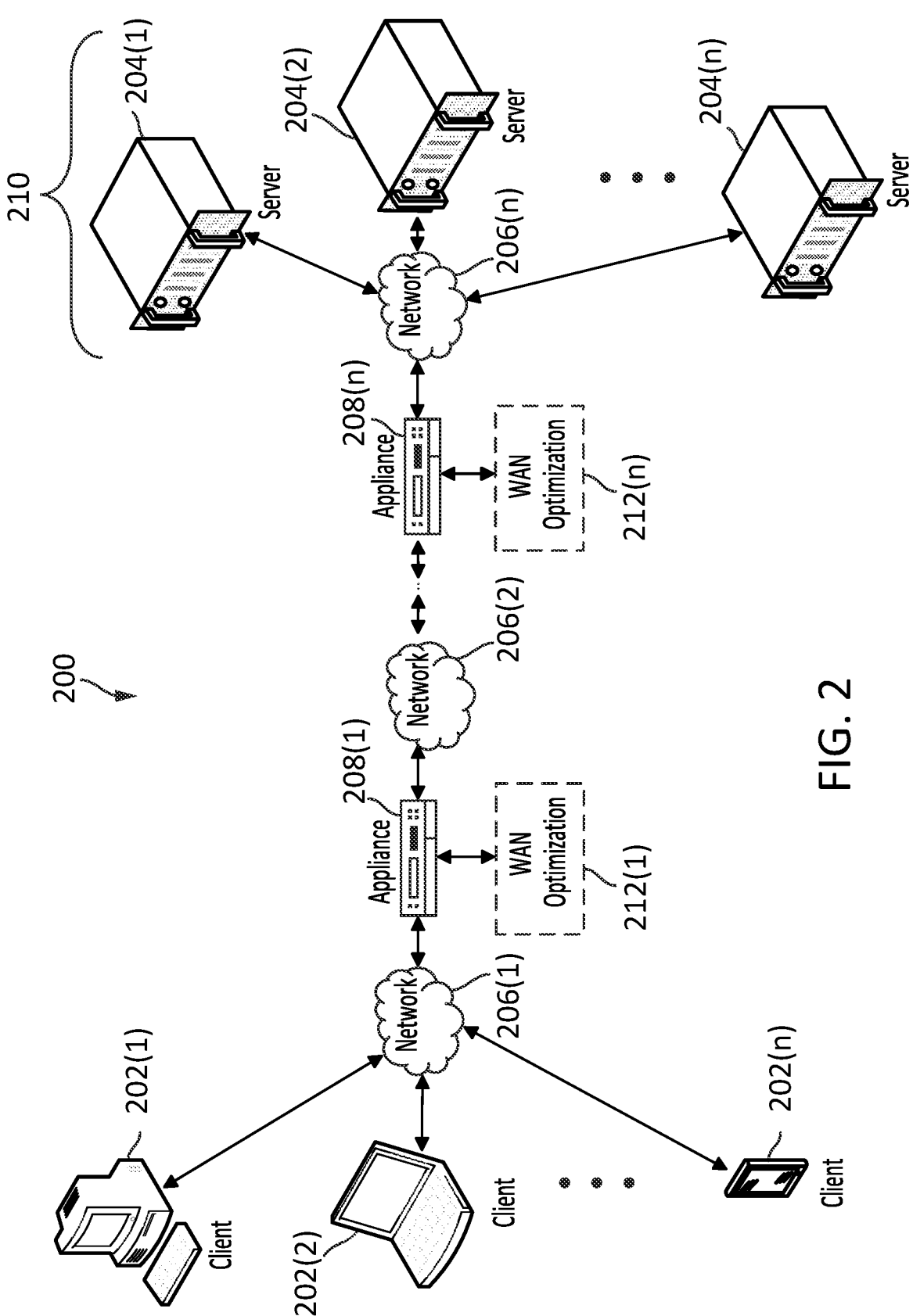
FIG. 2 is a diagram of a network environment in which some embodiments of the portal account management system disclosed herein may deployed.

Referring to FIG. 2, an illustrative network environment 200 is depicted. As shown, the network environment 200 may include one or more clients 202(1)-202(*n*) (also generally referred to as local machine(s) 202 or client(s) 202) in communication with one or more servers 204(1)-204(*n*) (also generally referred to as remote machine(s) 204 or server(s) 204) via one or more networks 206(1)-206(*n*) (generally referred to as network(s) 206). In some embodiments, a client 202 may communicate with a server 204 via one or more appliances 208(1)-208(*n*) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(*n*) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(*n*), as well as the network 206(2), may be public networks. In yet other embodiments, all three of the network 206(1), the network 206(2) and the network 206(*n*) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(*n*) may be deployed between the network 206(2) and the network 206(*n*). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(*n*), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of + an organization.

C. Computing Environment

Figure 3:
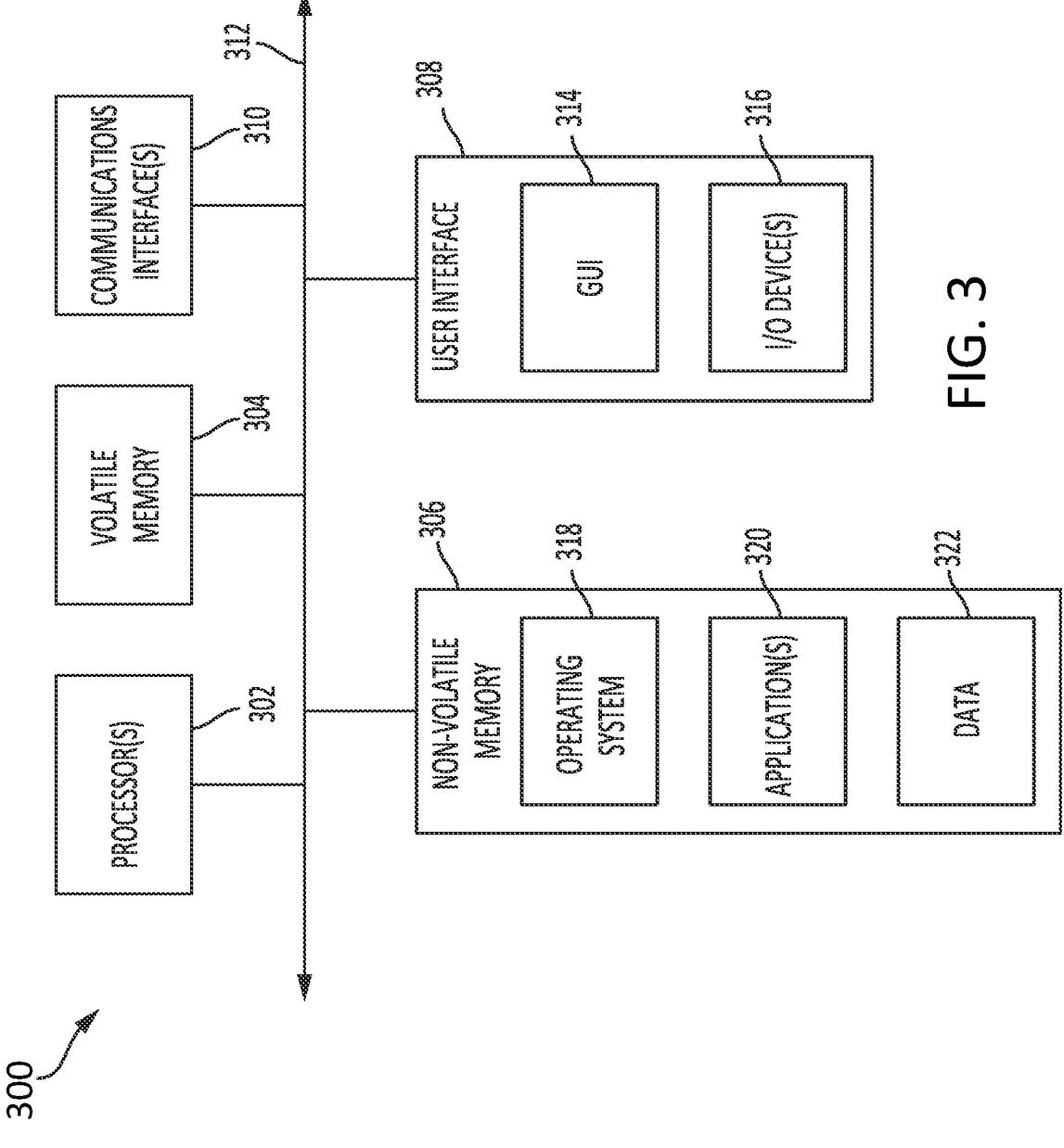
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via the communication bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
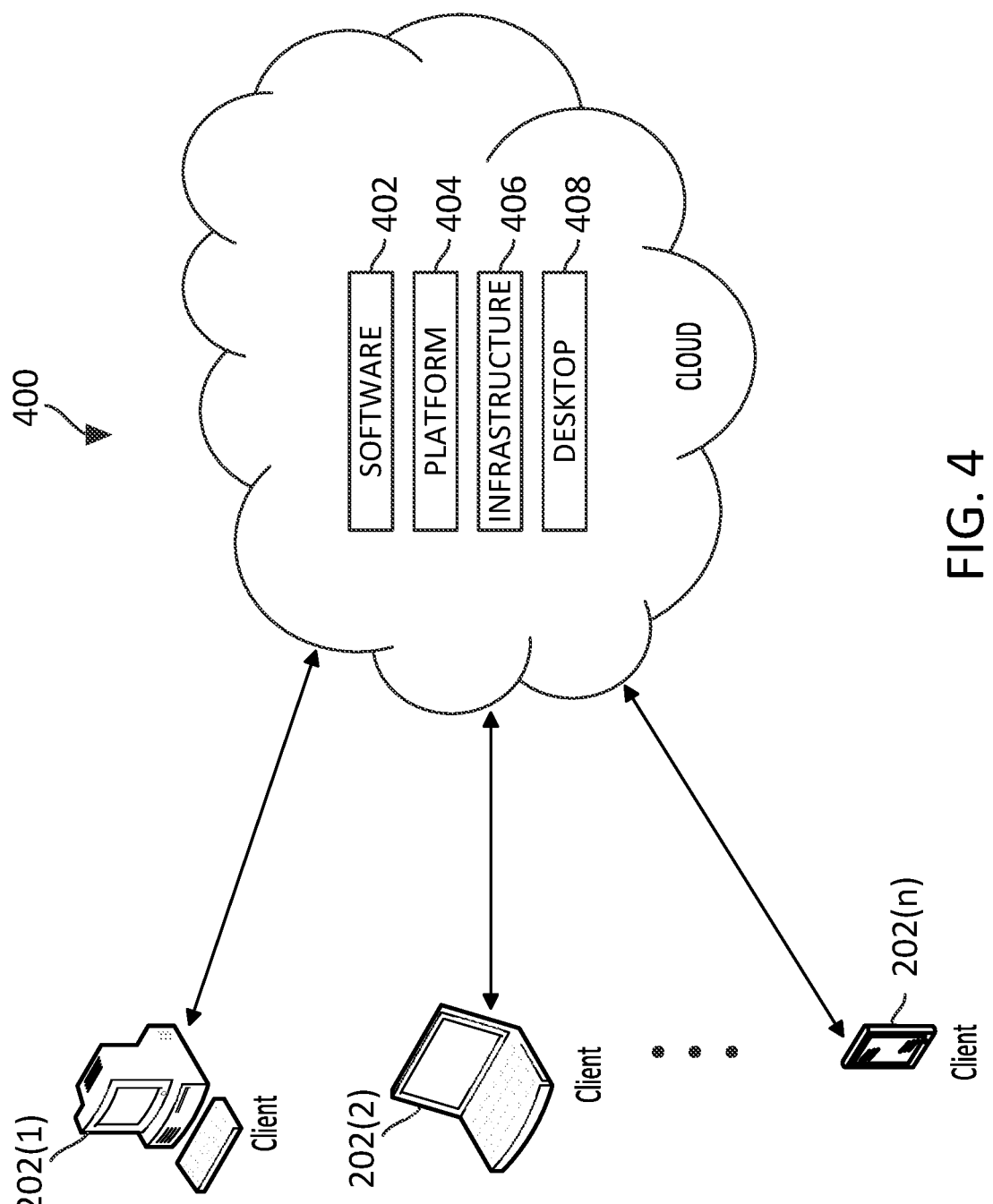
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Washington, Azure IaaS provided by Microsoft Corporation or Redmond, Washington, RACKSPACE CLOUD provided by Rackspace US, Inc., of San Antonio, Texas, Google Compute Engine provided by Google Inc. of Mountain View, California, and RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile® from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

Figure 5A:
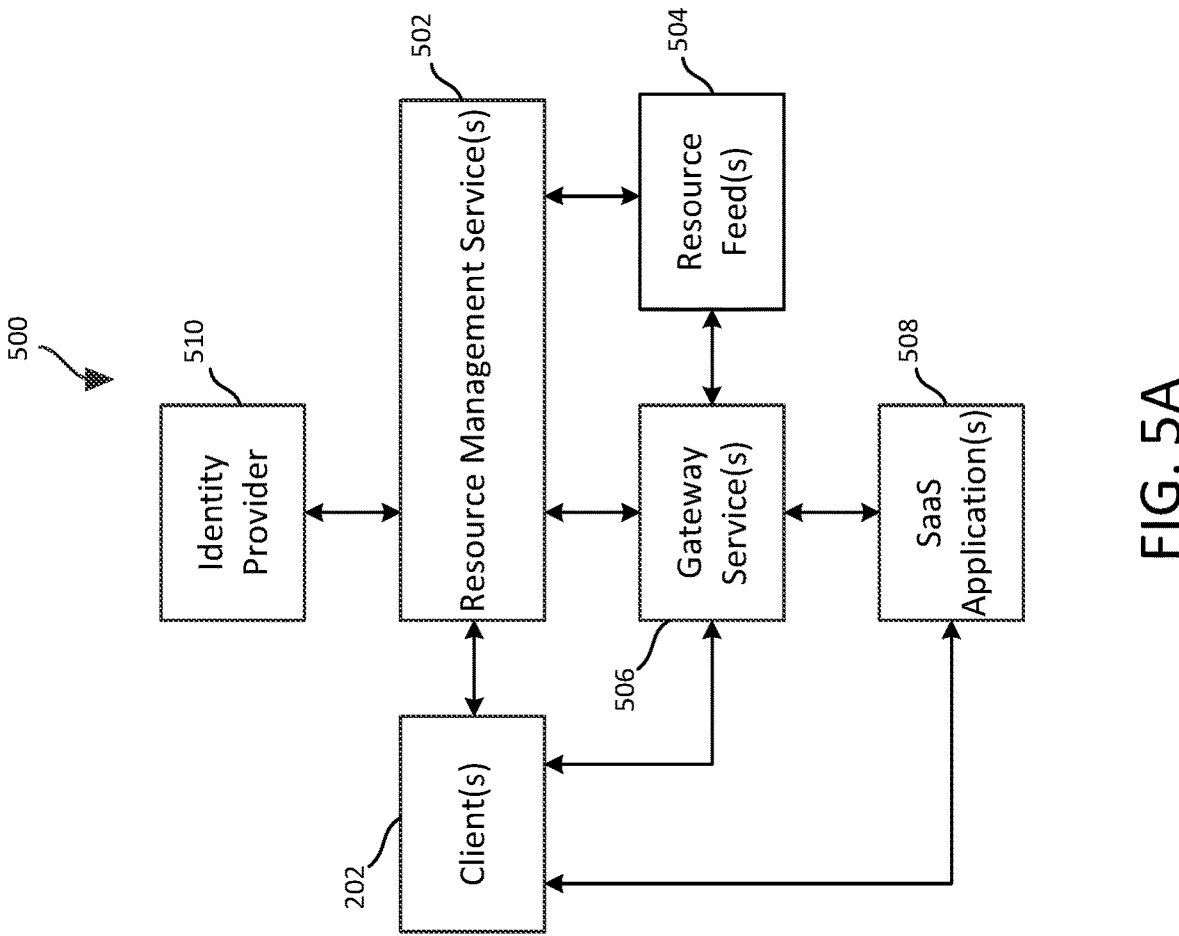
FIG. 5A is a block diagram of an example system in which resource management services may manage and streamline access by clients to resource feeds (via one or more gateway services) and/or software-as-a-service (SaaS) applications.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
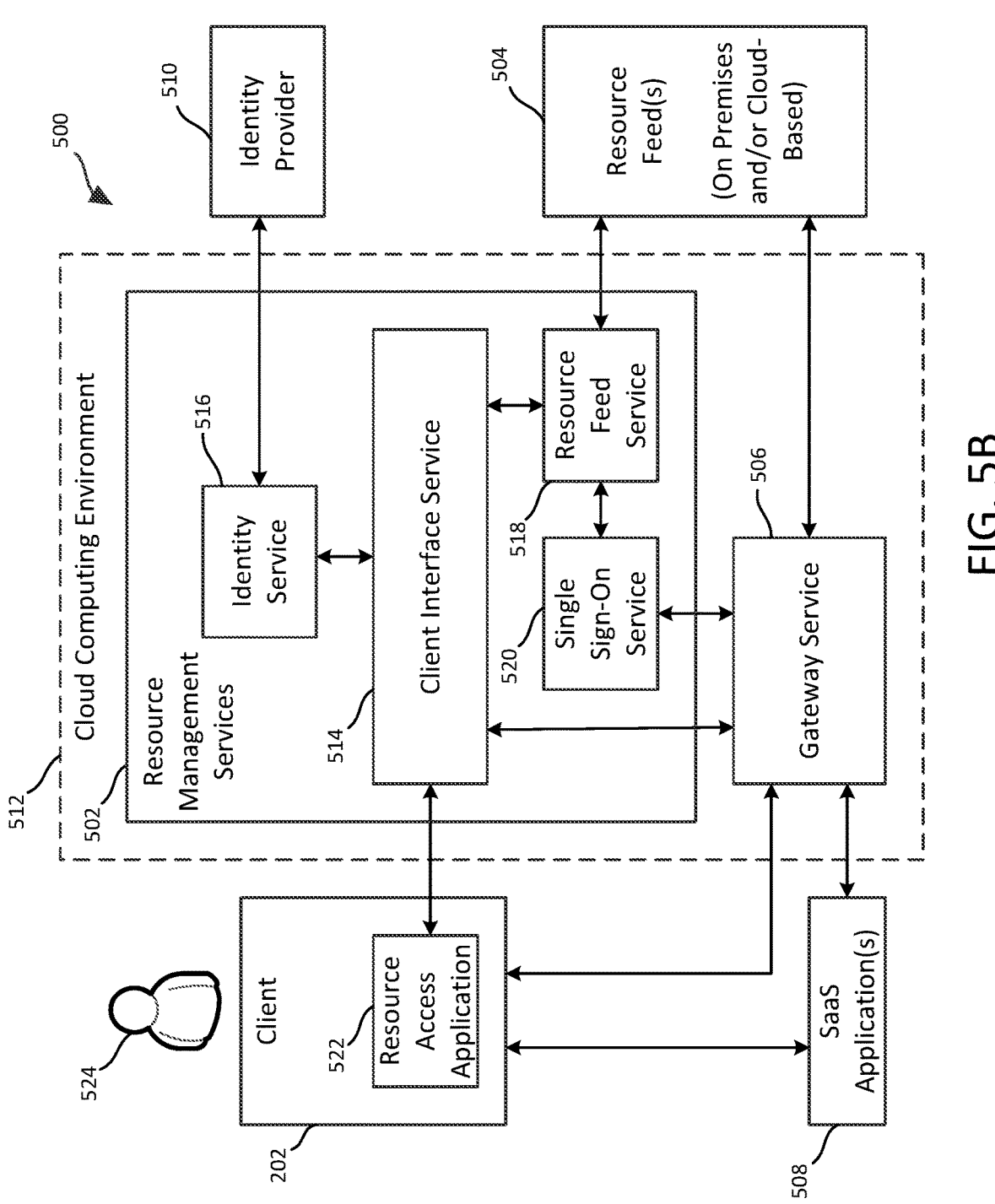
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B)

may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., username and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522.

The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
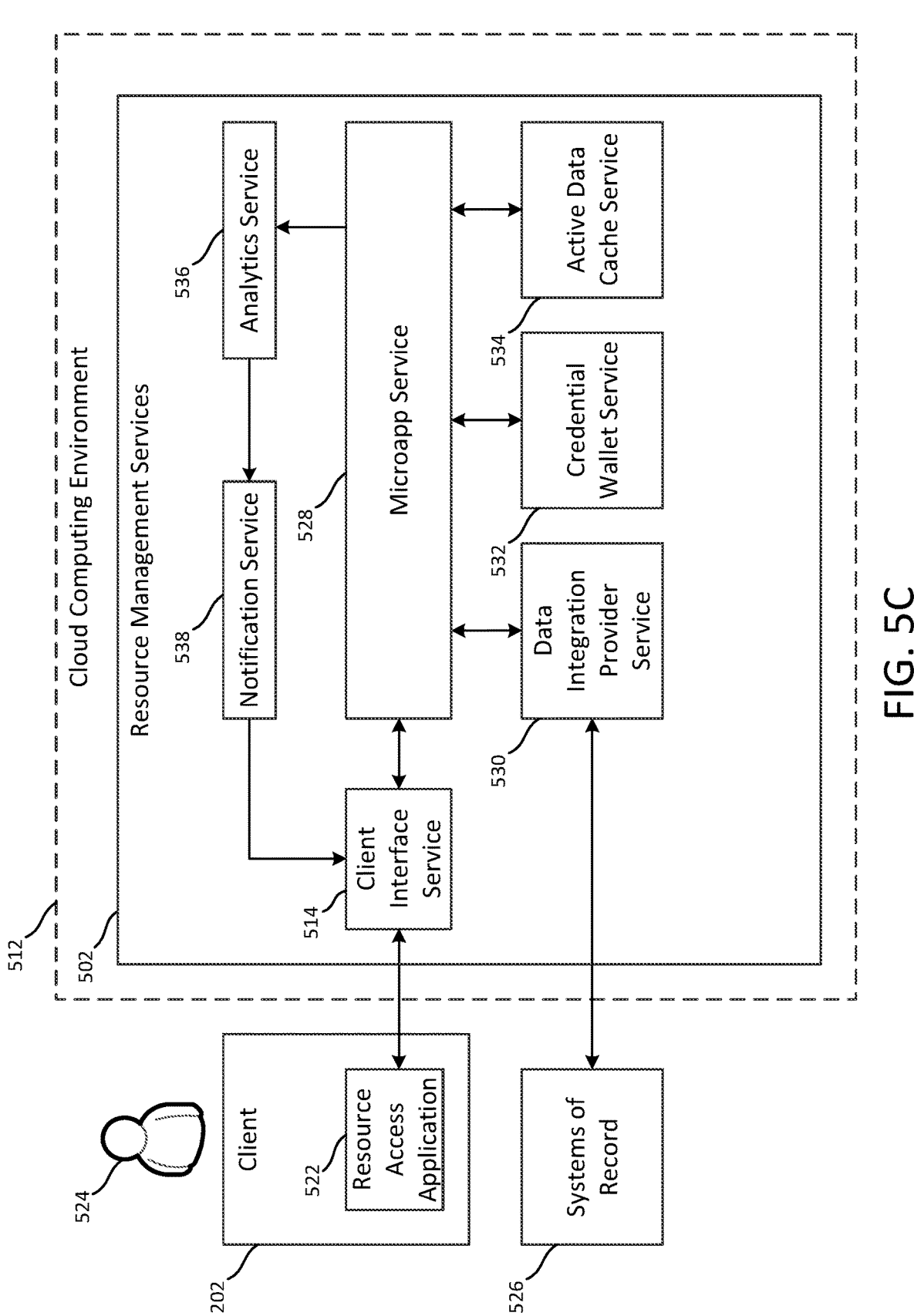
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapps service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream or otherwise provide the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

F. Detailed Description of Example Embodiments of the Portal Account System Introduced in Section A As discussed in Section A, in some implementations, a portal account system 100 (shown in FIG. 1A) may include a portal account management service 102 and a portal account routing service 104, with the portal account management service 102 being configured to create new portal accounts within one or more storage mediums 108, and the portal account routing service 104 being configured to route messages between one or more collaborations services 106 and the various portals accounts created within the storage mediums 108, as well as to allow one or more client devices 202b to interact with particular ones of such portal accounts, thus enabling the exchange of messages between one or more users 110a of the client device(s) 202a and one or more user(s) 110b of the client device(s) 202b.

Figure 6:
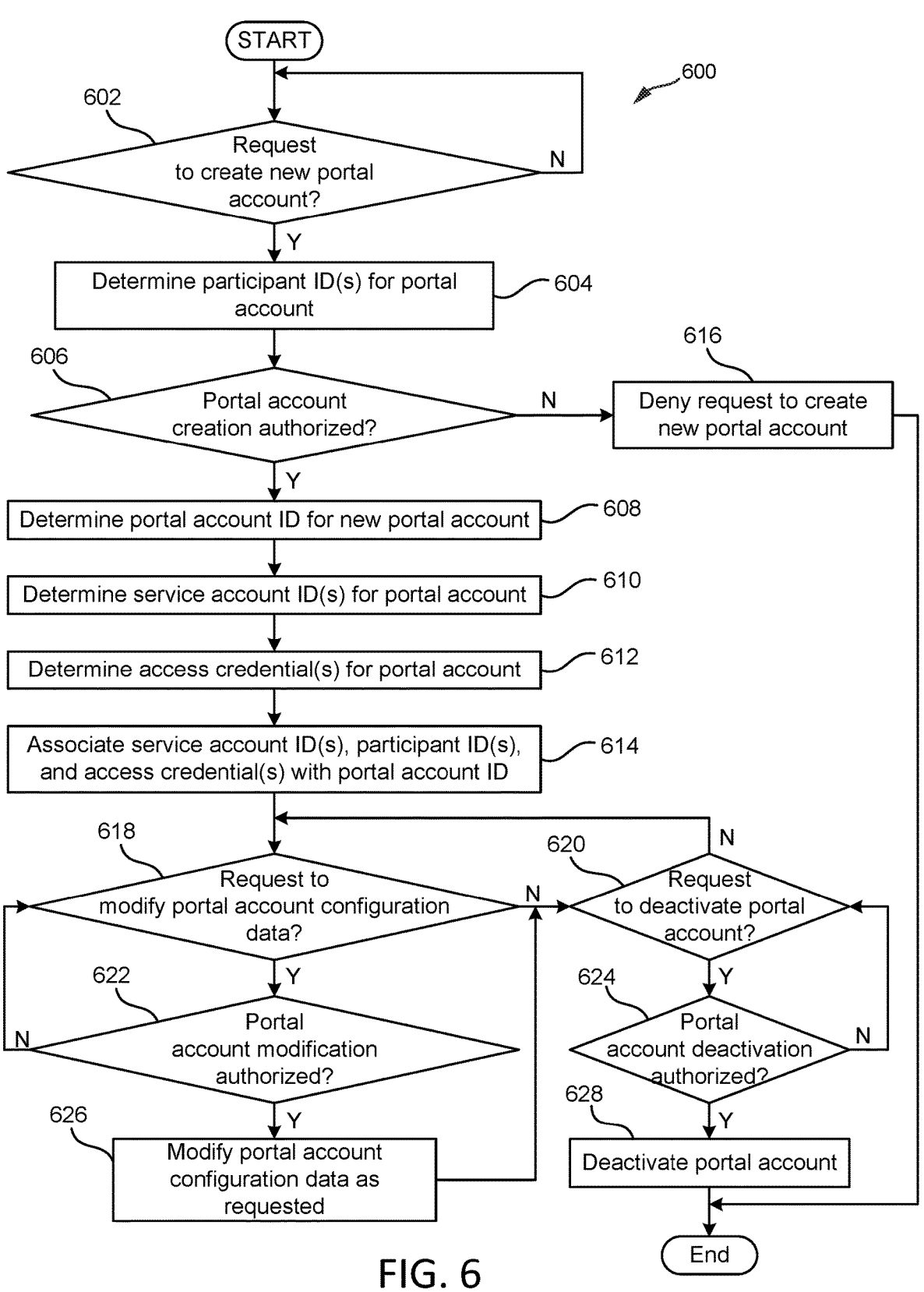
FIG. 6 shows an example routine that may be performed by the portal account management service shown in FIGS. 1A and 1B.

FIG. 6 shows an example routine 600 that may be performed by the portal account management service 102 in accordance with some embodiments of the present disclosure. As shown, the routine 600 may begin when, at a decision 602, the portal account management service 102 determines that it has received a request to create a new portal account. For example, with reference to FIG. 1C, the user 110a may operate the client device 202a to submit a request to the portal account management service 102 for a portal account to be established to enable the user 110a to communicate with the user 110b via one or more particular collaboration services 106 (e.g., Teams, Slack, etc.). Alternatively, the user 110a may submit a request to the portal account management service 102 for a portal account to be established to enable a group chat amongst a group of individuals, possibly but not necessarily including one or more users who can send and receive messages with the group via a web portal interface.

At a step 604 of the routine 600, the portal account management service 102 may determine one or more participant IDs to identify one or more individuals to whom new messages written to the portal account are to be distributed. In some implementations, such individuals may be identified in the request the user 110a submits to the portal account management service 102, or perhaps may, at least initially, include only an identify for the user 110a who is submitted the request. In other implementations, the portal account may be established without initially identifying any participant IDs, perhaps enabling the user 110b for whom the portal account is created to subsequently identify one or more participant IDs, e.g., by selecting one or more participant IDS from a list of authorized participant IDs that is provided by the portal account management service 102.

At a decision 606, the portal account management service 102 may determine whether creation of the requested portal account is authorized. In some implementation, for example, the portal account management service 102 may route the request to a system administrator for approval and/or a determination may be made as to whether the user 110a has previously been granted permission to establish new portal accounts, e.g., to allow the user 110a to use a collaboration service 106 (e.g., Teams) to communicate with contractors or other persons who are not employees of the same organization as the user 110a.

If, per the decision 606, the portal account management service 102 determines that creation of the new portal account is authorized, the routine may proceed to steps 608, 610, 612, and 614 (described below) at which the portal account management service 102 may determine the configuration data for the new portal account, as well as create and configure the new portal account accordingly. If, on the other hand, the portal account management service 102 determines (at the decision 606) that creation of the new portal account is not authorized, the routine may instead proceed to a step 616, at which the portal account management service 102 may notify the requesting user (e.g., the user 110a) that the request to create a new portal account is denied, and the routine 600 may thereafter terminate.

At the step 608 of the routine 600, the portal account management service 102 may determine a portal account ID for the new portal account, to enable the newly created portal account to be uniquely identified within the portal account system 100.

At the step 610 of the routine 600, the portal account management service 102 may determine one or more portal account IDs for the new portal account. As discussed in Section A, in some implementations, this step may involve sending requests to one or more collaboration services 106 to obtain service IDs (e.g., an identifier of a Teams guest account) that can be used to direct messages to the portal account that is being created.

At the step 612 of the routine 600, the portal account management service 102 may determine one or more access credentials for the new portal account. As discussed in Section A, such access credentials may take on any of numerous forms and may include, for example, data that is embedded within a QR code that can be sent to the user 110b for whom the portal account is created, to enable the user 110b to access the new portal account via a browser.

At the step 614 of the routine 600, the portal account management service 102 may associate the portal account ID determined at the step 608 with (A) any participant ID(s) determined at the step 604 (B) any service account ID(s) determined at the step 610, and (C) the access credential(s) determined at the step 612, such as by writing all such values to the same row of the table 120 (shown in FIGS. 1B and 1C).

After the step 614 is complete and the new portal account has been created, the routine 600 may proceed to decisions 618 and 620, at which the portal account management service 102 may determine whether (A) a request to modify the portal account configuration data, e.g., to add or delete one or more participant IDs or service account IDs, has been received (per the decision 618), or (B) whether a request to deactivate the portal account has been received (per the decision 620). In some implementations, for example, such requests can be made by the user 110a who initiated creation of the portal account and/or the user 110b for whom the portal account was created.

When, at the decision 618, the portal account management service 102 determines that a request to modify the portal account configuration data has been received, the routine 600 may proceed to a step 622, at which the portal account management service 102 may determine whether the requested modification is authorized. Similarly, when, at the decision 620, the portal account management service 102 determines that a request to deactivate the portal account has been received, the routine 600 may proceed to a step 624, at which the portal account management service 102 may determine whether the requested account deactivation is authorized. For example, similar to the decision 606 described above, in some implementations, such requests may be routed to a system administrator for approval and/or a determination may be made as to whether the requesting user 110a, 110b has previously been granted permission take the requested action.

When, at the decision, 622, the portal account management service 102 determines that the requested modification to the portal configuration data is authorized, the routine 600 may proceed to a step 626, at which the portal account management service 102 may make the requested modification to the portal account configuration data. Similarly, when, at the decision, 624, the portal account management service 102 determines that the requested deactivation of the portal account is authorized, the routine may proceed to a step 628, at which the portal account management service 102 may deactivate the portal account, such as by removing the row for the portal account from the table 120 or somehow marking the account as inactive so as disable its further use by the user 110b to whom it was assigned.

Figure 7:
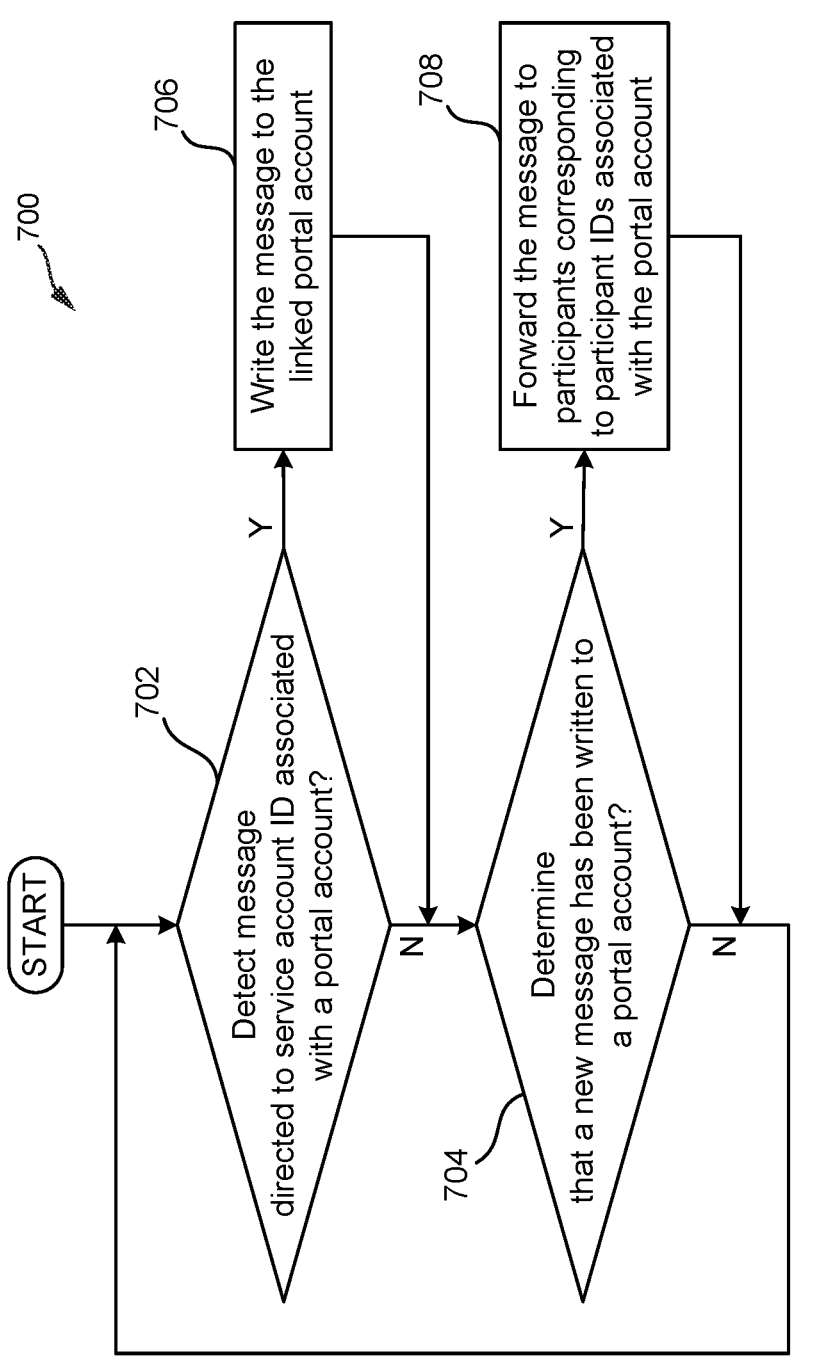
FIG. 7 shows an example routine that may be performed by the portal account routing service shown in FIGS. 1A and 1C.

FIG. 7 shows an example routine 700 that may be performed by the portal account routing service 104 in accordance with some embodiments of the present disclosure. As shown, the portal account routing service 104 may, per decisions 702 and 704, continuously determine whether (A) a message directed a service account ID associated with a portal account has been detected, or (B) a new message has been written to a portal account.

As noted previously, in some implementations, the portal account routing service 104 may use one or more APIs of the collaborations service(s) 106 to listen for and hook onto messages that have been directed to particular service account IDs. As shown, if the portal account routing service 104 detects a message directed a service account ID associated with a portal account, the routine 700 may proceed to a step 706, at which the portal account routing service 104 may write the detected message to the portal account with which the service account ID is associated. For example, with reference to the table 120 shown in FIG. 1C, if the portal account routing service 104 detects a message directed to the service account identifier "SA1," then that message may be written as a new "messages" entry 130 in the first row of the table 120.

When, at the decision 704, the portal account routing service 104 determines that a new message has been written to a portal account, the routine 700 may proceed to a step 708, at which the portal account routing service 104 may forward the new message to one or more participants who are identified by the participant IDs that are associated with that portal account. For example, with reference to the table 120 shown in FIG. 1C, if the portal account routing service 104 determines that a new message has been written as a new "messages" entry 130 in the first row of the table 120, the portal account routing service 104 may forward the message to the individual corresponding to participant ID "P1." As noted above, for identified participants who have one or more services accounts with one or more collaborations services 106, such messages may be forwarded to the individuals by instructing one or more collaboration services 106, e.g., via one or more APIs of the collaboration service(s) 106, to direct the message to service accounts associated with those individuals. For identified participants who have been assigned a portal account within the storage medium 108, messages may additionally or alternatively be forwarded to such individuals by writing such messages to the portal accounts assigned to them.

G. Example Implementations of Methods, Systems, and Computer-Readable Media in Accordance with the Present Disclosure The following paragraphs (M1) through (M7) describe examples of methods that may be implemented in accordance with the present disclosure.

(M1) A method may be performed that involves receiving, by a computing system, a first request to enable messages to be exchanged between a first client device operated by a first user and a second client device operated by a second user, wherein the first user has a first account with a first collaboration service, the first account including a first account identifier associated with the first user; determining, by the computing system, a second account identifier of a second account of the first collaboration service; creating, by the computing system and based at least in part on the first request, a third account within at least one storage medium associated with the computing system, the third account including a third account identifier; associating, by the computing system, the third account identifier with the second account identifier and at least a first access credential; receiving, by the computing system and from the first collaboration service, a first message directed to the second account; storing, by the computing system and based at least in part on the second account identifier being associated with the third account identifier, the first message in the at least one storage medium in association with the third account identifier; determining, by the computing system, that a second access credential received from the second client device corresponds to the first access credential; and enabling, by the computing system, the second client device to access the first message stored in the at least one storage medium based at least in part on the second access credential corresponding to the first access credential, the third account identifier being associated with the first access credential, and the first message being associated with the third account identifier.

(M2) A method may be performed as described in paragraph (M1), wherein determining the second account identifier may further involve sending, from the computing system to the first collaboration service and based at least in part on the first request, an instruction to create the second account with the first collaboration service.

(M3) A method may be performed as described in paragraph (M1) or paragraph (M2), and may further involve determining, by the computing system, that a second message has been stored in association with the third account identifier; determining, by the computing system, that a first participant identifier corresponding to the first user is stored in association with the third account identifier; and instructing, by the computing system and based at least in part on the first participant identifier being stored in association with the third account identifier, the first collaboration service to send the second message to the first account of the first collaboration service.

(M4) A method may be performed as described in paragraph (M3), and may further involve enabling, by the computing system, the second client device to cause the second message to be stored in association with the third account identifier based at least in part on the second access credential corresponding to the first access credential.

(M5) A method may be performed as described in paragraph (M3) or paragraph (M4), and may further involve determining, by the computing system, that a second participant identifier corresponding to a third user is stored in association with the third account identifier; and instructing, by the computing system and based at least in part on the second participant identifier being stored in association with the third account identifier, the first collaboration service to send the second message to a fourth account that is associated with the third user.

(M6) A method may be performed as described in any of paragraphs (M3) through (M4), wherein instructing the first collaboration service to send the second message to the first account may further involve sending a request via a network to an application programming interface of the first collaboration service.

(M7) A method may be performed as described in any of paragraphs (M1) through (M6), and may further involve sending, via a network and to an application programming interface of the first collaboration service, a second request to be notified of messages directed to the second account; wherein the computing system may receive the first message from the first collaboration service in response to the second request.

The following paragraphs (S1) through (S7) describe examples of systems and devices that may be implemented in accordance with the present disclosure.

(S1) A computing system may include at least one processor, and at least one computer-readable medium encoded with instructions which, when executed by the at least one processor, cause the computing system to receive a first request to enable messages to be exchanged between a first client device operated by a first user and a second client device operated by a second user, wherein the first user has a first account with a first collaboration service, the first account including a first account identifier associated with the first user, to determine a second account identifier of a second account of the first collaboration service, to create, based at least in part on the first request, a third account within at least one storage medium associated with the computing system, the third account including a third account identifier, to associate the third account identifier with the second account identifier and at least a first access credential, to receive, from the first collaboration service, a first message directed to the second account, to store, based at least in part on the second account identifier being associated with the third account identifier, the first message in the at least one storage medium in association with the third account identifier, to determine that a second access credential received from the second client device corresponds to the first access credential, and to enable the second client device to access the first message stored in the at least one storage medium based at least in part on the second access credential corresponding to the first access credential, the third account identifier being associated with the first access credential, and the first message being associated with the third account identifier.

(S2) A computing system may be configured as described in paragraph (S1), wherein the at least one computer-readable medium may be further encoded with additional instructions which, when executed by the at least one processor, further cause the computing system to determine the second account identifier at least on part by sending, to the first collaboration service and based at least in part on the first request, an instruction to create the second account with the first collaboration service.

(S3) A computing system may be configured as described in paragraph (S1) or paragraph (S2), wherein the at least one computer-readable medium may be further encoded with additional instructions which, when executed by the at least one processor, further cause the computing system to determine that a second message has been stored in association with the third account identifier, to determine that a first participant identifier corresponding to the first user is stored in association with the third account identifier, and to instruct, based at least in part on the first participant identifier being stored in association with the third account identifier, the first collaboration service to send the second message to the first account of the first collaboration service.

(S4) A computing system may be configured as described in paragraph (S3), wherein the at least one computer-readable medium may be further encoded with additional instructions which, when executed by the at least one processor, further cause the computing system to enable the second client device to cause the second message to be stored in association with the third account identifier based at least in part on the second access credential corresponding to the first access credential.

(S5) A computing system may be configured as described in paragraph (S3) or paragraph (S4), wherein the at least one computer-readable medium may be further encoded with additional instructions which, when executed by the at least one processor, further cause the computing system to determine that a second participant identifier corresponding to a third user is stored in association with the third account identifier, and to instruct, based at least in part on the second participant identifier being stored in association with the third account identifier, the first collaboration service to send the second message to a fourth account that is associated with the third user.

(S6) A computing system may be configured as described in any of paragraphs (S3) through (S4), wherein the at least one computer-readable medium may be further encoded with additional instructions which, when executed by the at least one processor, further cause the computing system to instruct the first collaboration service to send the second message to the first account at least in part by sending a request via a network to an application programming interface of the first collaboration service.

(S7) A computing system may be configured as described in any of paragraphs (S1) through (S6), wherein the at least one computer-readable medium may be further encoded with additional instructions which, when executed by the at least one processor, further cause the computing system to send, via a network and to an application programming interface of the first collaboration service, a second request to be notified of messages directed to the second account; wherein the computing system may receive the first message from the first collaboration service in response to the second request.

The following paragraphs (CRM1) through (CRM7) describe examples of computer-readable media that may be implemented in accordance with the present disclosure.

(CRM1) At least one non-transitory computer-readable medium may be encoded with instructions which, when executed by at least one processor of a computing system, cause the computing system to receive a first request to enable messages to be exchanged between a first client device operated by a first user and a second client device operated by a second user, wherein the first user has a first account with a first collaboration service, the first account including a first account identifier associated with the first user, to determine a second account identifier of a second account of the first collaboration service, to create, based at least in part on the first request, a third account within at least one storage medium associated with the computing system, the third account including a third account identifier, to associate the third account identifier with the second account identifier and at least a first access credential, to receive, from the first collaboration service, a first message directed to the second account, to store, based at least in part on the second account identifier being associated with the third account identifier, the first message in the at least one storage medium in association with the third account identifier, to determine that a second access credential received from the second client device corresponds to the first access credential, and to enable the second client device to access the first message stored in the at least one storage medium based at least in part on the second access credential corresponding to the first access credential, the third account identifier being associated with the first access credential, and the first message being associated with the third account identifier.

(CRM2) At least one non-transitory computer-readable medium may be configured as described in paragraph (CRM1), and may be further encoded with additional instructions which, when executed by the at least one processor, further cause the computing system to determine the second account identifier at least on part by sending, to the first collaboration service and based at least in part on the first request, an instruction to create the second account with the first collaboration service.

(CRM3) At least one non-transitory computer-readable medium may be configured as described in paragraph (CRM1) or paragraph (CRM2), and may be further encoded with additional instructions which, when executed by the at least one processor, further cause the computing system to determine that a second message has been stored in association with the third account identifier, to determine that a first participant identifier corresponding to the first user is stored in association with the third account identifier, and to instruct, based at least in part on the first participant identifier being stored in association with the third account identifier, the first collaboration service to send the second message to the first account of the first collaboration service.

(CRM4) At least one non-transitory computer-readable medium may be configured as described in paragraph (CRM3), and may be further encoded with additional instructions which, when executed by the at least one processor, further cause the computing system to enable the second client device to cause the second message to be stored in association with the third account identifier based at least in part on the second access credential corresponding to the first access credential.

(CRM5) At least one non-transitory computer-readable medium may be configured as described in paragraph (CRM3) or paragraph (CRM4), and may be further encoded with additional instructions which, when executed by the at least one processor, further cause the computing system to determine that a second participant identifier corresponding to a third user is stored in association with the third account identifier, and to instruct, based at least in part on the second participant identifier being stored in association with the third account identifier, the first collaboration service to send the second message to a fourth account that is associated with the third user.

(CRM6) At least one non-transitory computer-readable medium may be configured as described in any of paragraphs (CRM3) through (CRM4), and may be further encoded with additional instructions which, when executed by the at least one processor, further cause the computing system to instruct the first collaboration service to send the second message to the first account at least in part by sending a request via a network to an application programming interface of the first collaboration service.

(CRM7) At least one non-transitory computer-readable medium may be configured as described in any of paragraphs (CRM1) through (CRM6), and may be further encoded with additional instructions which, when executed by the at least one processor, further cause the computing system to send, via a network and to an application programming interface of the first collaboration service, a second request to be notified of messages directed to the second account; wherein the computing system may receive the first message from the first collaboration service in response to the second request.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:

receiving, by a computing system, a first request to enable messages to be exchanged over a computer network between a first client device operated by a first user and a second client device operated by a second user, wherein the first user has a first account with a first collaboration service, the first account including a first account identifier associated with the first user;

determining, by the computing system, a second account identifier of a second account of the first collaboration service;

creating, by the computing system and based at least in part on the first request, a third account within at least one storage medium associated with the computing system, the third account including a third account identifier;

associating, by the computing system, the third account identifier with the second account identifier and at least a first access credential;

monitoring, by a portal account routing service executed by the computing system, messages sent over the computer network;

identifying, by the portal account routing service and from the first collaboration service, a first message transmitted over the computer network and directed to the second account;

storing, by the computing system and based at least in part on the second account identifier being associated with the third account identifier, the first message in the at least one storage medium in association with the third account identifier;

determining, by the computing system, that a second access credential received from the second client device corresponds to the first access credential; and enabling, by the computing system, the second client device to access the first message stored in the at least one storage medium based at least in part on the second access credential corresponding to the first access credential, the third account identifier being associated with the first access credential, and the first message being associated with the third account identifier.

2. The method of claim 1, wherein determining the second account identifier further comprises:

sending, from the computing system to the first collaboration service and based at least in part on the first request, an instruction to create the second account with the first collaboration service.

3. The method of claim 1, further comprising:

determining, by the computing system, that a second message has been stored in association with the third account identifier;

determining, by the computing system, that a first participant identifier corresponding to the first user is stored in association with the third account identifier; and instructing, by the computing system and based at least in part on the first participant identifier being stored in association with the third account identifier, the first collaboration service to send the second message to the first account of the first collaboration service.

4. The method of claim 3, further comprising:

enabling, by the computing system, the second client device to cause the second message to be stored in association with the third account identifier based at least in part on the second access credential corresponding to the first access credential.

5. The method of claim 3, further comprising:

determining, by the computing system, that a second participant identifier corresponding to a third user is stored in association with the third account identifier; and instructing, by the computing system and based at least in part on the second participant identifier being stored in association with the third account identifier, the first collaboration service to send the second message to a fourth account that is associated with the third user.

6. The method of claim 3, wherein instructing the first collaboration service to send the second message to the first account comprises sending a request via a network to an application programming interface of the first collaboration service.

7. The method of claim 1, further comprising:

sending, via a network and to an application programming interface of the first collaboration service, a second request to be notified of messages directed to the second account;

wherein the computing system receives the first message from the first collaboration service in response to the second request.

8. A computing system, comprising:

at least one processor; and at least one non-transitory computer-readable medium encoded with instructions which, when executed by the at least one processor, cause the computing system to:

receive a first request to enable messages to be exchanged over a computer network between a first client device operated by a first user and a second client device operated by a second user, wherein the first user has a first account with a first collaboration service, the first account including a first account identifier associated with the first user;

determine a second account identifier of a second account of the first collaboration service;

create, based at least in part on the first request, a third account within at least one storage medium associated with the computing system, the third account including a third account identifier;

associate the third account identifier with the second account identifier and at least a first access credential;

monitor, by a portal account routing service executed by the computing system, messages sent over the computer network;

identify, by the portal account routing service and from the first collaboration service, a first message transmitted over the computer network and directed to the second account;

store, based at least in part on the second account identifier being associated with the third account identifier, the first message in the at least one storage medium in association with the third account identifier;

determine that a second access credential received from the second client device corresponds to the first access credential; and enable the second client device to access the first message stored in the at least one storage medium based at least in part on the second access credential corresponding to the first access credential, the third account identifier being associated with the first access credential, and the first message being associated with the third account identifier.

9. The computing system of claim 8, wherein the at least one computer-readable medium is further encoded with additional instructions which, when executed by the at least one processor, further cause the computing system to determine the second account identifier at least in part by sending, to the first collaboration service and based at least in part on the first request, an instruction to create the second account with the first collaboration service.

10. The computing system of claim 8, wherein the at least one computer-readable medium is further encoded with additional instructions which, when executed by the at least one processor, further cause the computing system to:

determine that a second message has been stored in association with the third account identifier;

determine that a first participant identifier corresponding to the first user is stored in association with the third account identifier; and instruct, based at least in part on the first participant identifier being stored in association with the third account identifier, the first collaboration service to send the second message to the first account of the first collaboration service.

11. The computing system of claim 10, wherein the at least one computer-readable medium is further encoded with additional instructions which, when executed by the at least one processor, further cause the computing system to:

enable the second client device to cause the second message to be stored in association with the third account identifier based at least in part on the second access credential corresponding to the first access credential.

12. The computing system of claim 10, wherein the at least one computer-readable medium is further encoded with additional instructions which, when executed by the at least one processor, further cause the computing system to:

determine that a second participant identifier corresponding to a third user is stored in association with the third account identifier; and instruct, based at least in part on the second participant identifier being stored in association with the third account identifier, the first collaboration service to send the second message to a fourth account that is associated with the third user.

13. The computing system of claim 10, wherein the at least one computer-readable medium is further encoded with additional instructions which, when executed by the at least one processor, further cause the computing system to instruct the first collaboration service to send the second message to the first account at least in part by sending a request via a network to an application programming interface of the first collaboration service.

14. The computing system of claim 8, wherein the at least one computer-readable medium is further encoded with additional instructions which, when executed by the at least one processor, further cause the computing system to:

send, via a network and to an application programming interface of the first collaboration service, a second request to be notified of messages directed to the second account; and receive the first message from the first collaboration service in response to the second request.

15. At least one non-transitory computer-readable medium encoded with instructions which, when executed by at least one processor of a computing system, cause the computing system to:

receive a first request to enable messages to be exchanged between a first client device operated by a first user and a second client device operated by a second user, wherein the first user has a first account with a first collaboration service, the first account including a first account identifier associated with the first user;

determine a second account identifier of a second account of the first collaboration service;

create, based at least in part on the first request, a third account within at least one storage medium associated with the computing system, the third account including a third account identifier;

associate the third account identifier with the second account identifier and at least a first access credential;

monitor, by a portal account routing service executed by the computing system, messages sent over the computer network;

identify, by the portal account routing service and from the first collaboration service, a first message transmitted over the computer network and directed to the second account;

store, based at least in part on the second account identifier being associated with the third account identifier, the first message in the at least one storage medium in association with the third account identifier;

determine that a second access credential received from the second client device corresponds to the first access credential; and enable the second client device to access the first message stored in the at least one storage medium based at least in part on the second access credential corresponding to the first access credential, the third account identifier being associated with the first access credential, and the first message being associated with the third account identifier.

16. The at least one non-transitory computer-readable medium of claim 15, further encoded with additional instructions which, when executed by the at least one processor, further cause the computing system to determine the second account identifier at least in part by sending, to the first collaboration service and based at least in part on the first request, an instruction to create the second account with the first collaboration service.

17. The at least one non-transitory computer-readable medium of claim 15, further encoded with additional instructions which, when executed by the at least one processor, further cause the computing system to:

determine that a second message has been stored in association with the third account identifier;

determine that a first participant identifier corresponding to the first user is stored in association with the third account identifier; and instruct, based at least in part on the first participant identifier being stored in association with the third account identifier, the first collaboration service to send the second message to the first account of the first collaboration service.

18. The at least one non-transitory computer-readable medium of claim 17, further encoded with additional instructions which, when executed by the at least one processor, further cause the computing system to:

enable the second client device to cause the second message to be stored in association with the third account identifier based at least in part on the second access credential corresponding to the first access credential.

19. The at least one non-transitory computer-readable medium of claim 17, further encoded with additional instructions which, when executed by the at least one processor, further cause the computing system to instruct the first collaboration service to send the second message to the first account at least in part by sending a request via a network to an application programming interface of the first collaboration service.

20. The at least one non-transitory computer-readable medium of claim 16, further encoded with additional instructions which, when executed by the at least one processor, further cause the computing system to:

send, via a network and to an application programming interface of the first collaboration service, a second request to be notified of messages directed to the second account; and receive the first message from the first collaboration service in response to the second request.

* * * * *